United States Patent
Wada et al.

(10) Patent No.: US 9,115,753 B2
(45) Date of Patent: Aug. 25, 2015

(54) MOTION DEVICE

(71) Applicant: THK CO., LTD., Tokyo (JP)

(72) Inventors: Mitsumasa Wada, Tokyo (JP); Takuya Horie, Tokyo (JP); Ayako Miyajima, Tokyo (JP); Takeshi Shimamura, Tokyo (JP); Teruaki Ooka, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/384,331

(22) PCT Filed: Mar. 6, 2013

(86) PCT No.: PCT/JP2013/056144
§ 371 (c)(1),
(2) Date: Sep. 10, 2014

(87) PCT Pub. No.: WO2013/137085
PCT Pub. Date: Sep. 19, 2013

(65) Prior Publication Data
US 2015/0036953 A1    Feb. 5, 2015

(30) Foreign Application Priority Data

Mar. 14, 2012   (JP) ................. 2012-057360

(51) Int. Cl.
*F16C 29/06* (2006.01)

(52) U.S. Cl.
CPC ............. *F16C 29/0607* (2013.01); *F16C 29/06* (2013.01); *F16C 29/065* (2013.01); *F16C 29/0609* (2013.01); *F16C 29/0611* (2013.01)

(58) Field of Classification Search
CPC ............. F16C 29/0602; F16C 29/0604; F16C 29/0607; F16C 29/0609; F16C 29/0611; F16C 29/0652; F16C 29/0654; F16C 29/0664; F16C 29/0666
USPC ..................................... 384/43–45
See application file for complete search history.

(56) References Cited

U.S. PATENT DOCUMENTS

| 6,132,093 A * | 10/2000 | Michioka et al. ........... 384/45 |
| 7,862,236 B2 * | 1/2011 | Chen ........................... 384/45 |
| 2002/0136472 A1 | 9/2002 | Mochizuki et al. |

FOREIGN PATENT DOCUMENTS

| JP | 2002-54633 A | 2/2002 |
| JP | 3123236 U | 7/2006 |
| JP | 2007120528 A * | 5/2007 |
| JP | 2008057698 A * | 3/2008 |
| JP | 4635735 B2 | 2/2011 |

OTHER PUBLICATIONS

International Search Report dated Apr. 9, 2013 issued in corresponding application No. PCT/JP2013/056144.

* cited by examiner

*Primary Examiner* — Phillip A Johnson
(74) *Attorney, Agent, or Firm* — Westerman, Hattori, Daniels & Adrian, LLP

(57) ABSTRACT

A motion device includes a track rail, a moving body, rolling elements, fixing members each fixed to an end surface of the moving body, and rolling element circulation members arranged between the moving body and the fixing members. The rolling element circulation members each have a connection section connected to the moving body so as to be rotatable about a Y direction, and a pair of first outside surfaces. The fixing members each have accommodation sections to accommodate the rolling element circulation members, and a pair of first inside surfaces closely contact with the pair of first outside surfaces. The respective rolling element circulation members and the accommodation sections are provided at both sides of the track rail interposed there between.

14 Claims, 8 Drawing Sheets

MOTION DEVICE

TECHNICAL FIELD

The present invention relates to a motion device.

Priority is claimed on Japanese Patent Application No. 2012-057360, filed Mar. 14, 2012, the content of which is incorporated herein by reference.

BACKGROUND ART

A linear guide (linear motion guide) includes a guide rail, a slider block, and a rolling element. A circulation path of the rolling element is formed between the guide rail and the slider block. The guide rail and the slider block relatively operate (move) by circulation of the rolling element within the circulation path.

The linear guide is formed with a direction changing passage of the circulation path by disposing a rolling element circulation member at an end surface of the slider block in a movement direction thereof. The rolling element circulation member is fixed by an end plate which is itself fixed to the end surface of the slider block and interposed between the end plate and the slider block.

CITATION LIST

Patent Literature

[Patent Literature 1]
Japanese Patent No. 4635735

SUMMARY OF INVENTION

Technical Problem

To arrange the rolling element circulation member such that the rolling element circulation member is accurately positioned with respect to the slider block, a positioning structure is used in which a boss formed at a direction changing passage formation member is fitted into a hole formed on the end surface of the slider block. The positioning structure is configured in a plural number to be provided at a plurality of positions such that the rolling element circulation member does not rotate relative to the slider block. For this reason, there is a need to form a plurality of positioning holes on the end surface of the slider block.

However, since the slider block is a member made of a metal material, there is a problem in that manufacturing cost increases due to formation of the positioning holes.

The present invention has been made in view of the above problem, and an object of the present invention is to provide a motion device capable of realizing reliable positioning of a rolling element circulation member.

Solution to Problem

In accordance with a first aspect of the present invention, a motion device includes a track rail, a moving body movable along the track rail, rolling elements rolling in an endless circulation passage formed at the track rail and the moving body, fixing members each fixed to an end surface of the moving body in a movement direction thereof, and rolling element circulation members arranged between the moving body and the fixing members to circulate the rolling elements, wherein each of the rolling element circulation members includes a connection section connected to the end surface of the moving body so as to be rotatable about the movement direction, and a pair of first outside surfaces arranged in parallel with the movement direction and intersecting each other, each of the fixing members includes accommodation sections to accommodate the rolling element circulation members, and a pair of first inside surfaces formed at each of the accommodation sections to closely contact with the pair of first outside surfaces, and the rolling element circulation members and the accommodation sections are provided at both sides of the track rail interposed therebetween.

In a second aspect of the motion device according to the first aspect of the present invention, each of the rolling element circulation members may include a second outside surface parallel with one side surface of the pair of outside surfaces, and each of the fixing members may include a second inside surface closely contacts with the second outside surface in the associated one of the accommodation sections.

In a third aspect of the motion device according to the second aspect of the present invention, each of the rolling element circulation members may include a third outside surface parallel with the other side surface of the pair of outside surfaces, and each of the fixing members may include a third inside surface closely contacts with the third outside surface in the associated one of the accommodation sections.

In a fourth aspect of the motion device according to the third aspect of the present invention, the first, second, and third outside surfaces and the first, second, and third inside surfaces may be arranged on the same circumference about the movement direction centered on the connection section.

In a fifth aspect of the motion device according to any one of the first to fourth aspects of the present invention, each of the rolling element circulation members may be a rolling element direction changing passage formation member formed with a direction changing passage of the endless circulation passage.

In a sixth aspect of the motion device according to any one of the first to fifth aspects of the present invention, the fixing members may be lid bodies to accommodate the rolling element circulation members, and the accommodation sections may be concave sections to cover outer surfaces of the rolling element circulation members.

In a seventh aspect of the motion device according to the sixth aspect of the present invention, a first rolling element direction changing passage may be formed in each of the rolling element circulation members, a second rolling element direction changing passage may be formed by an outer surface of each of the rolling element circulation members and an inner surface of each of the concave sections, and the first rolling element direction changing passage and the second rolling element direction changing passage may intersect each other when viewed from the movement direction.

Advantageous Effects of Invention

According to the present invention, a pair of first outside surfaces of the rolling element circulation member closely contacts with a pair of first inside surfaces of an accommodation section of a fixing member so that rotation thereof is restricted while a rolling element circulation member is rotatably connected to an end surface of a moving body. Consequently, the rolling element circulation member is reliably positioned and fixed with respect to the moving body.

DESCRIPTION OF EMBODIMENTS

Hereinafter, a linear motion guide 1 according to an embodiment of the present invention will be described with reference to the drawings.

Figure 1:
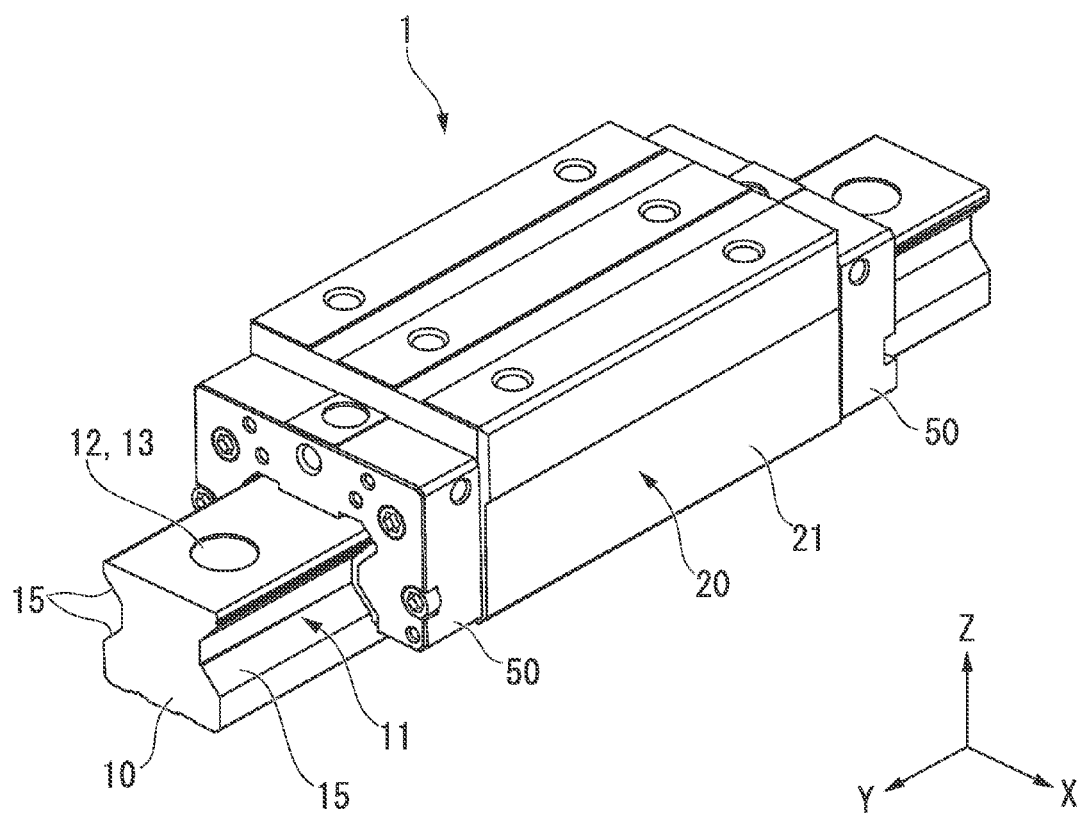
FIG. 1 is a perspective view illustrating an external appearance of a linear motion guide 1.

FIG. 1 is a perspective view illustrating an external appearance of a linear motion guide 1.

Figure 2:
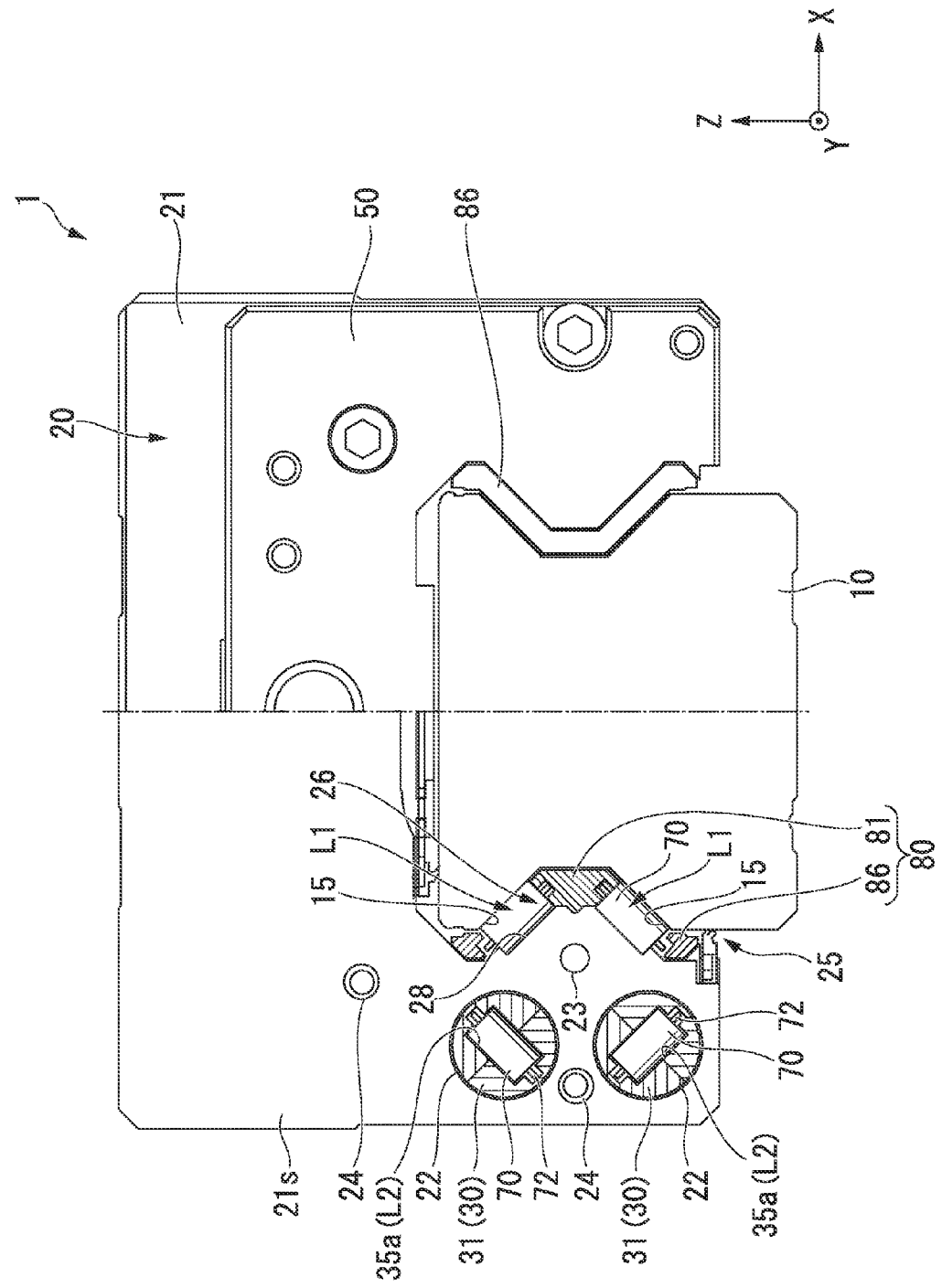
FIG. 2 is a front and cross-sectional view of the linear motion guide 1.

FIG. 2 is a front and cross-sectional view of the linear motion guide 1.

Figure 3:
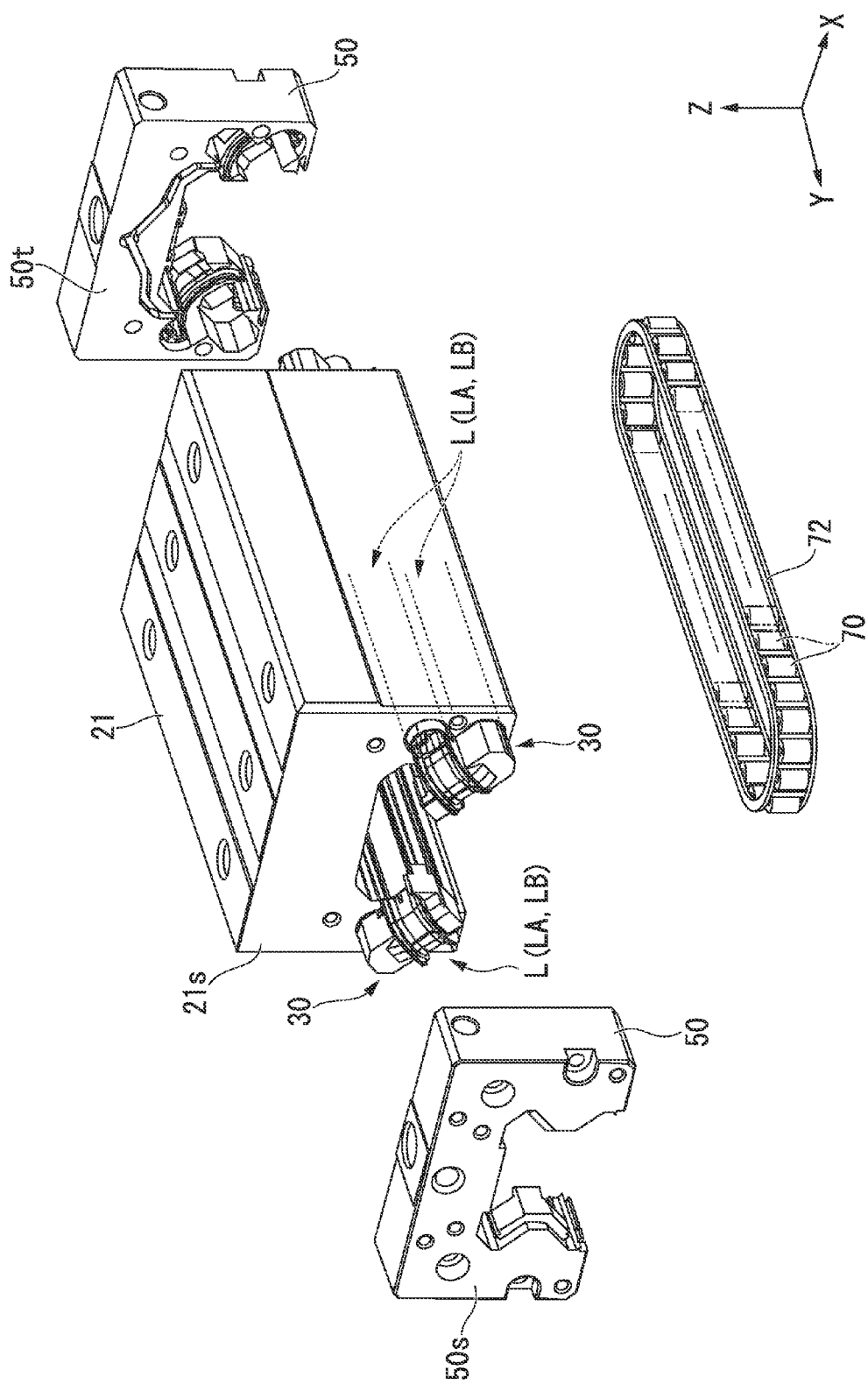
FIG. 3 is an exploded perspective view of a slider block 20.

FIG. 3 is an exploded perspective view of a slider block 20.

Figure 4:
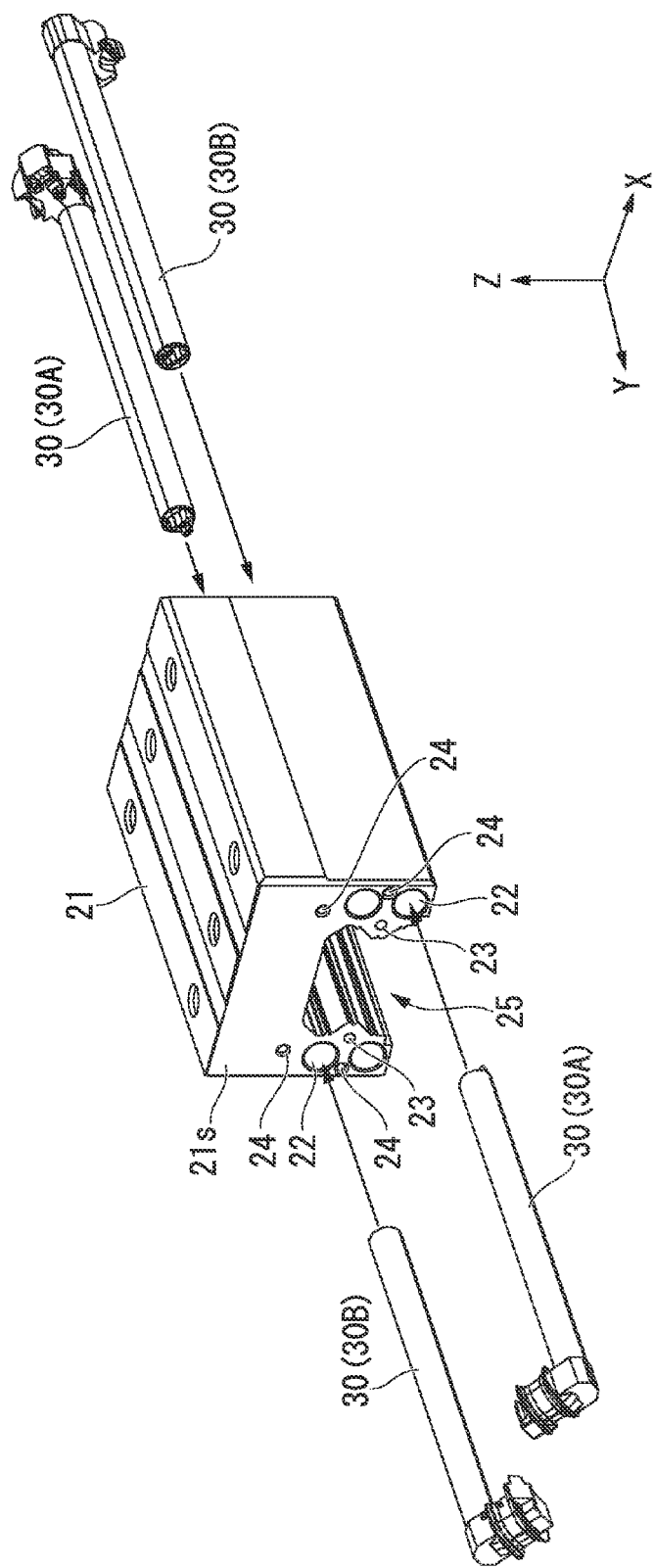
FIG. 4 is an exploded perspective view of the slider block 20.

FIG. 4 is an exploded perspective view of the slider block 20.

In the following description, a direction in which a track rail 10 and a slider block 20 overlap is referred to as a Z direction. A direction (a longitudinal direction of the slider block 20) in which the track rail 10 extends among directions perpendicular to the Z direction is referred to as a Y direction (movement direction). A direction perpendicular to the Z direction and Y direction is referred to as an X direction (width direction).

A linear motion guide (motion device) 1 includes the track rail 10, the slider block 20 movable in the extension direction of the track rail 10 or the like.

The track rail (track body) 10 is a metal member having a substantially rectangular shape in a cross-section perpendicular to the Y direction. In a pair of outside surfaces 11 directed in the X direction among outer surfaces of the track rail 10, centers of the outside surfaces 11 in the Z direction are recessed more than both ends. The recessed portions are formed with smooth rolling element rolling surfaces 15 extending in the Y direction. One of the outside surfaces 15 is formed with a pair of rolling element rolling surfaces 15 which intersect (face) each other at an angle of 90 degrees. The track rail 10 has four rolling element rolling surfaces 15.

The track rail 10 has a plurality of bolt mounting holes 12 formed to be penetrated in the Z direction and spaced apart from each other in the Y direction. The track rail 10 is fixed to a base member or the like (not shown) by bolts 13 inserted into the bolt mounting holes 12.

The slider block (moving body) 20 includes a rectangular parallelepiped block body 21, turn pipes 30, each of which forms a portion of an endless circulation passage L within the slider block 20, and flat end plates 50 arranged at both end surfaces 21s of the block body 21 in the Y direction.

The slider block 20 further includes a plurality of rollers 70. Four endless circulation passages L forming an endless elliptical ring shape or an oval ring shape are formed in the slider block 20. The plurality of rollers 70 are maintained to be capable of rolling and running (rolling) within the four endless circulation passages L.

Each of the endless circulation passages L is configured of a pair of linear portions which extend in the Y direction and a pair of semicircular arc-curved portions which connect end portions of the pair of linear portions. One of the linear portions is a load rolling element rolling passage L1 and the other thereof is a non-load rolling element passage L2. The pair of semicircular arc-curved portions are rolling element direction changing passages L3 and L4.

The block body (moving body) 21 has a "C"-shaped or a "U"-shaped cross-section. The block body 21 has a groove section 25 which is formed in the Y direction at a bottom surface thereof and is opened in the −Z direction. The track rail 10 is accommodated with a slight gap in the groove section 25.

A pair of inside surfaces 26 of the groove section 25 are formed with protrusion portions configured to face the recessed portions of the outside surfaces 11 of the track rail 10. The protrusion portions are formed with smooth rolling element rolling surfaces 28 extending in the Y direction. One of the inside surfaces 26 is formed with a pair of rolling element rolling surfaces 28 which intersect each other back to back at an angle of 90 degrees. The block body 21 has four rolling element rolling surfaces 28.

The inside surfaces 26 are each provided with a retainer cover 80 (a central cover 81 and upper and lower covers 86) for preventing separation of the rollers 70.

The four rolling element rolling surfaces 15 on the track rail 10 and the four rolling element rolling surfaces 28 on the block body 21 are arranged to face each other. A space (a chamber extending in the Y direction) defined between each of the rolling element rolling surfaces 15 and the associated rolling element rolling surface 28 becomes the load rolling element rolling passage L1 in which the rollers 70 roll.

The block body 21 has four through-holes 22 penetrated in the Y direction. The four through-holes 22 are opened to both end surfaces 21s of the block body 21 in the Z direction.

The through-holes 22 are symmetrically provided two-by-two at both sides in the X direction, with the groove section 25 interposed therebetween. Two through-holes 22, which are each provided at both sides in the X direction, are symmetrically provided at both sides in the Z direction with the protrusion portions on the inside surfaces 26 of the groove section 25 interposed therebetween.

The turn pipes 30 are respectively inserted into the four through-holes 22. Both end surfaces 21s of the block body 21 in the Z direction are formed with positioning holes 23 for fixing the turn pipes 30. The block body 21 has four positioning holes 23.

In each of the end surfaces 21s, the positioning holes 23 are symmetrically provided one-by-one at both sides in the X direction, with the groove section 25 interposed therebetween. The positioning holes 23 are provided one-by-one at end surface portions corresponding to the protrusion portions on the inside surfaces 26 of the groove section 25.

Each of the positioning holes 23 is disposed at a center in the Z direction in relation to the two through-holes 22 which are provided at both sides in the X direction. In other words, the two through-holes 22 are symmetrically provided at both sides in the Z direction with the positioning hole 23 interposed therebetween.

Tapped holes 24 used to fix the end plates 50 are formed four-by-four on both end surfaces 21s of the block body 21.

Figure 5:
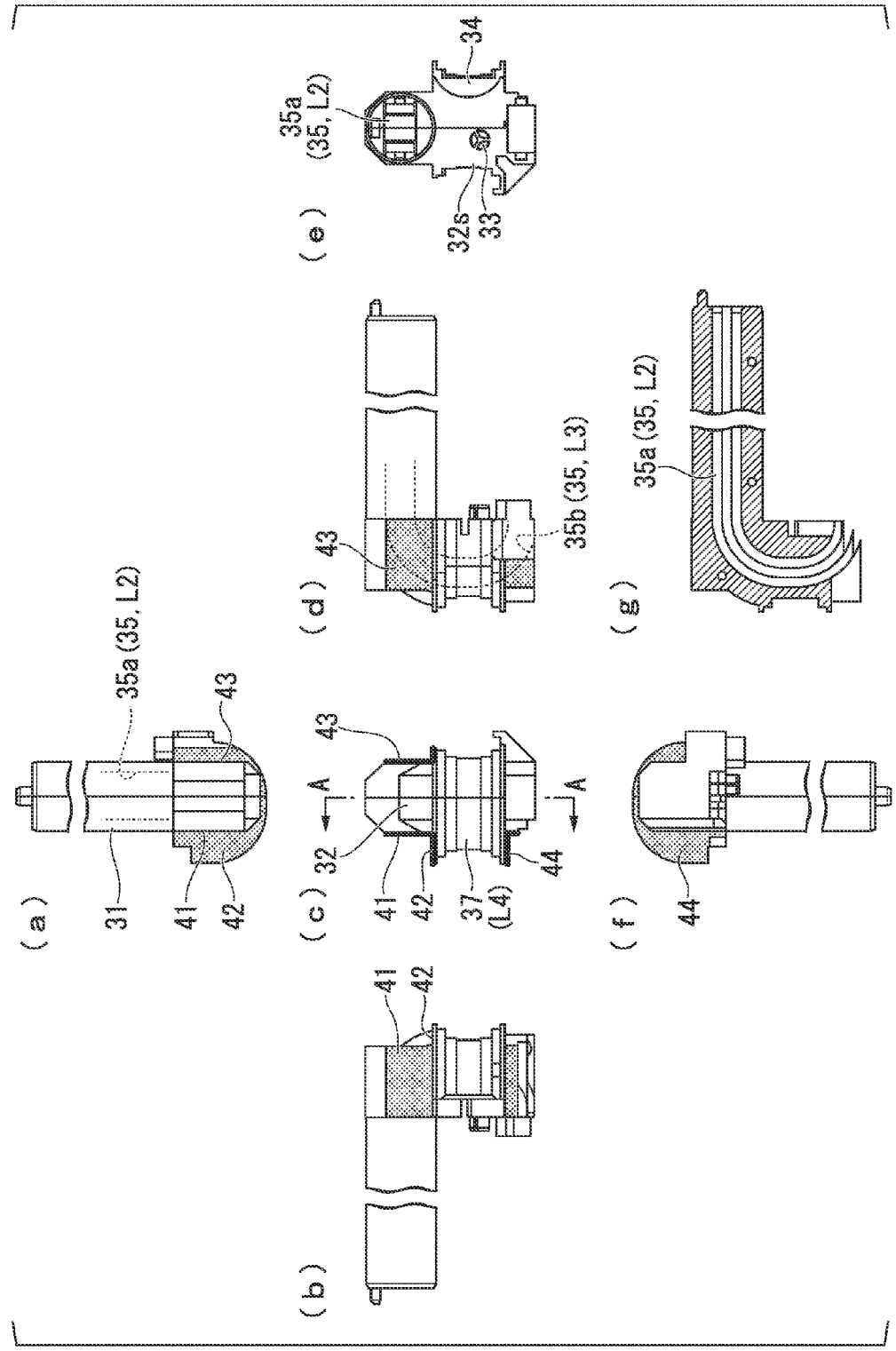
FIG. 5 is a view illustrating one of turn pipes 30.

FIG. 5 is a view illustrating one of the turn pipes 30. Here, (a) is a top view, (b) is a left side view, (c) is a front view, (d) is a right side view, (e) is a rear view, (f) is a bottom view, and (g) is a cross-sectional view taken along line A-A.

In the front view of FIG. 5(c), a forward and backward (depth) direction corresponds to the Y direction. In FIG. 5, abutting outer surfaces 41, 42, 43, and 44 are highlighted by thick lines or dots.

Each of the turn pipes (rolling element circulation member, rolling element direction changing passage formation member) 30 is a resin-formed member which forms a portion of the endless circulation passage L (LA, LB) formed within the slider block 20.

The turn pipe 30 includes a long cylindrical pipe section 31 which forms the non-load rolling element passage L2 of the endless circulation passage L (LA), and a return section 32 which forms the rolling element direction changing passage L3 of the endless circulation passage L (LA). The return section 32 is integrally arranged at one end of the pipe section 31.

A roller rolling hole 35a which has a rectangular cross-section and a linear shape is formed in the pipe section 31. The roller rolling hole 35a serves as the non-load rolling element passage L2.

A roller rolling hole 35b which has a rectangular cross-section and an arc shape according to the shape of the return section 32 is formed in the return section 32. The roller rolling hole 35b serves as the rolling element direction changing passage L3.

The roller rolling hole 35a of the pipe section 31 and the roller rolling hole 35b of the return section 32 communicate with and are integrally formed with each other so as to form a roller rolling hole 35 having a "J" shape.

An outer surface of the return section 32 forms a portion of another endless circulation passage L (LB) different from the endless circulation passage L (LA) formed with the roller rolling hole 35. The outer surface of the return section 32 is formed with a roller rolling inner peripheral surface 37 having a groove-shaped cross-section which serves as an inner peripheral surface of a rolling element direction changing passage L4 of another endless circulation passage L (LB).

In the outer surface of the return section 32, the roller rolling inner peripheral surface (outer surface) 37 is formed in a semicircular arc shape having the same radius of curvature as the roller rolling hole 35b.

The roller rolling inner peripheral surface 37 is arranged so as to cross over (extend over) the roller rolling hole 35b in a width direction. When viewed from the front side, the roller rolling hole 35b (endless circulation passage LA) is arranged orthogonal to the roller rolling inner peripheral surface 37 (endless circulation passage LB).

In the outer surface of the return section 32, an inward surface 32s on a side connected to the pipe section 31 is smoothly formed. The inward surface 32s is formed with a columnar positioning boss 33. The positioning boss (connection section) 33 is fitted into the positioning holes 23 formed on the end surfaces 21s of the block body 21.

The inward surface 32s of the return section 32 is formed with a pipe connection section 34 connected to a tip of a pipe section 31 of another turn pipe 30B. One end of the roller rolling inner peripheral surface 37 is exposed to the pipe connection section 34.

The outer surface of the return section 32 is formed with a plurality of smooth abutting outer surfaces 41 to 44. Each of the abutting outer surfaces 41 to 44 is a surface parallel with a longitudinal direction of the pipe section 31. When the return section 32 is viewed from the inward surface 32s side, the abutting outer surfaces 41 to 44 are arranged at positions which intersect the same imaginary circle C centered on the positioning boss 33 (see FIG. 8).

The abutting outer surfaces 41 to 44 are surfaces which abut (closely contact with) inner surfaces of a return accommodation section 55 of the end plate 50 to be described later.

The abutting outer surface (first outside surface) 41 is formed on one side surface of a portion of the return section 32 connected to the pipe section 31. The abutting outer surface (first outside surface) 42 is formed on an outer wall surface of one side of the roller rolling inner peripheral surface 37. The abutting outer surface 41 and the abutting outer surface 42 are arranged so as to be mutually orthogonal and interconnected. The abutting outer surface (second outside surface) 43 is formed on the other side surface of the portion of the return section 32 connected to the pipe section 31. The abutting outer surface 41 is arranged in parallel with the abutting outer surface 43. The abutting outer surface (third outside surface) 44 is formed on an outer wall surface of the other side of the roller rolling inner peripheral surface 37. The abutting outer surface 42 is arranged in parallel with the abutting outer surface 44.

Figure 6:
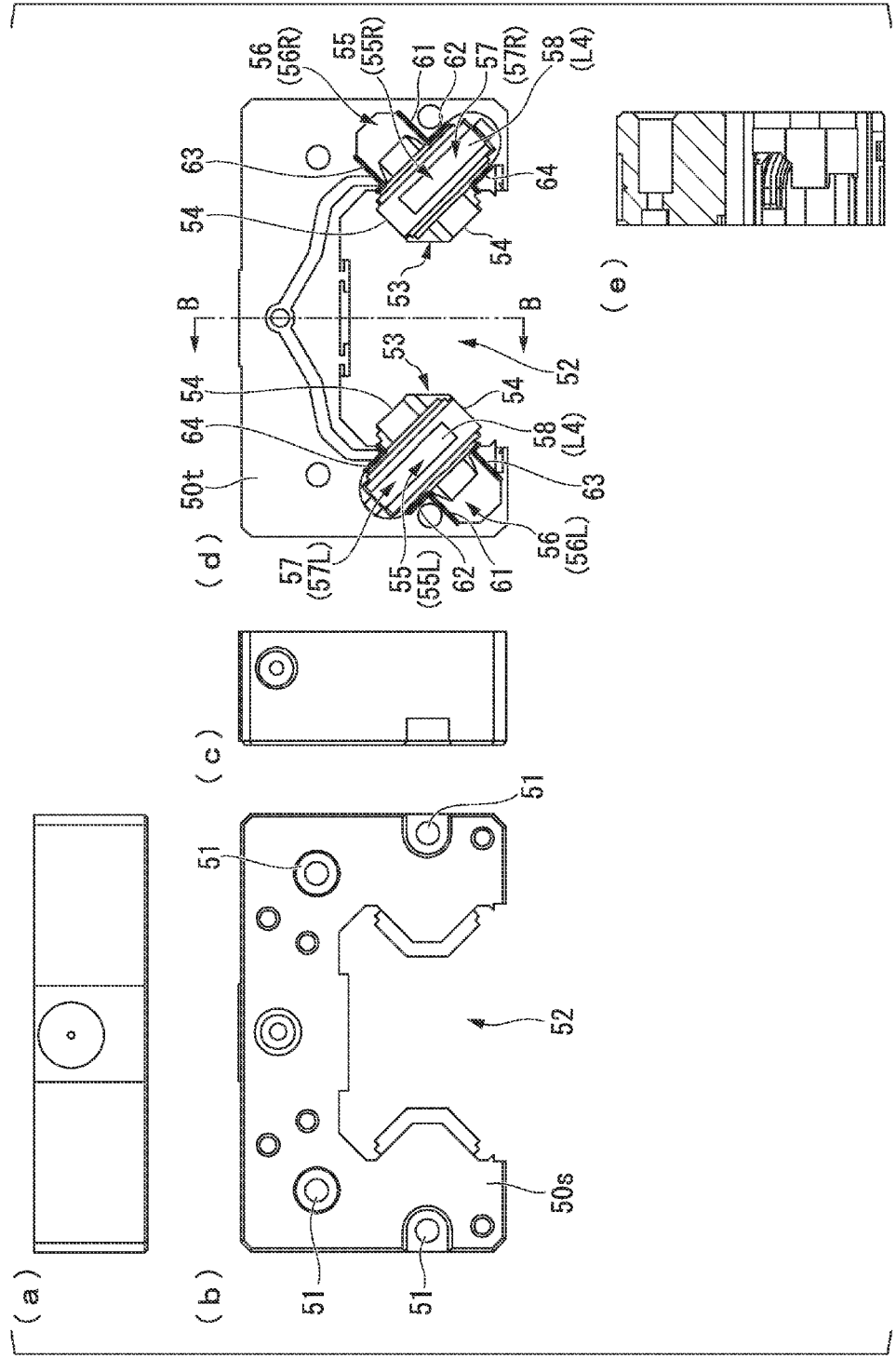
FIG. 6 is a view illustrating one of end plates 50.

FIG. 6 is a view illustrating one of the end plates 50. Here, (a) is a top view, (b) is a front view, (c) is a right side view, (d) is a rear view, (e) is a cross-sectional view taken along line B-B.

In the front view of FIG. 6(b), a vertical direction corresponds to the Z direction, a horizontal direction corresponds to the X direction, and a forward and backward (depth) direction corresponds to the Y direction. In FIG. 6, abutting inner surfaces 61, 62, 63, and 64 are highlighted by thick lines.

The end plates (fixing members, lid bodies) 50 are flat resin-formed members fixed to both end surfaces 21s of the block body 21. Similarly to the block body 21, each of the end plates 50 has a "C"-shaped or "U"-shaped cross-section. The end plate 50 has a groove section 52 which is formed at a bottom surface thereof and is opened in the −Z direction. The track rail 10 is accommodated with a slight gap in the groove section 52.

A pair of inside surfaces 53 of the groove section 52 are formed with protrusion portions configured to face the recessed portions of the outside surfaces 11 of the track rail 10. Such protrusion portions has the same shape as the protrusion portions formed on the inside surfaces 26 of the groove section 25 of the block body 21. The inside surfaces 53 are formed with four smooth plane surfaces 54 extending in the Y direction so as to correspond to the four rolling element rolling surfaces 28 of the block body 21.

The return sections 32 of the turn pipes 30 are disposed between the end plate 50 and the block body 21. A rear surface 50t of the end plate 50 is formed with return accommodation sections 55 which accommodate the return sections 32 of the turn pipes 30.

The return accommodation sections (accommodation section, concave section) 55 have accommodation grooves 56 and 57 which extend in directions intersecting from the four plane surfaces 54. The accommodation grooves 56 and 57 are integrally formed one-by-one at both of the return accommodation sections 55, with the groove section 52 interposed therebetween.

In the rear view of FIG. 6(d), in the right return accommodation section 55R with the groove section 52 interposed between the return accommodation sections, the accommodation groove 56R is formed to have an angle of 45 degrees toward a bottom side of the groove section 52 from an opening side thereof. The accommodation groove 57R is formed to have an angle of 45 degrees toward the opening side of the groove section 52 from the bottom side thereof. The accommodation groove 56R and the accommodation groove 57R are orthogonally arranged.

In the rear view of FIG. 6(d), in the left return accommodation section 55L with the groove section 52 interposed between the return accommodation sections, the accommodation groove 56L is formed to have an angle of 45 degrees toward the opening side of the groove section 52 from the bottom side thereof. The accommodation groove 57L is formed to have an angle of 45 degrees toward the bottom side of the groove section 52 from the opening side thereof. The accommodation groove 56L and the accommodation groove 57L are orthogonally arranged.

Each of the accommodation grooves 56 (56R, 56L) is formed to be capable of accommodating a main portion of the return section 32 of the associated turn pipe 30. The accommodation groove 56 accommodates a portion (rolling element direction changing passage L3) of the endless circulation passage LA.

In addition, each of the accommodation grooves 57 (57R, 57L) is formed to be capable of accommodating a wall portion of the roller rolling inner peripheral surface 37 of the associated return section 32. The accommodation groove 57 accommodates a portion (rolling element direction changing passage L4) of the endless circulation passage LB.

A bottom surface (inner surface) of the accommodation groove 57 is formed with a roller rolling outer peripheral surface 58 which serves as an outer peripheral surface of the rolling element direction changing passage L4 of the endless circulation passage LB. The roller rolling outer peripheral surface (inner surface) 58 is formed in a semicircular arc shape having a greater radius of curvature than the roller rolling inner peripheral surface 37.

The roller rolling inner peripheral surface 37 of the return section 32 and the roller rolling outer peripheral surface 58 of the return accommodation section 55 are paired to form the rolling element direction changing passage L4 of the endless circulation passage LB.

Each of the end plates 50 has four stepped through-holes 51 formed toward the rear surface 50t from a front surface 50s. Bolts (not shown) are inserted into the four stepped through-holes 51 and are fastened to the tapped holes 24 on the end surface 21s of the block body 21. Thereby, the end plates 50 are tightly fixed to both end surfaces 21s of the block body 21.

The side surfaces of the accommodation grooves 56 and 57 of each return accommodation section 55 are formed with a plurality of smooth abutting inner surfaces 61 to 64. Each of the abutting inner surfaces 61 to 64 is a surface parallel with a thickness direction of the end plate 50.

The abutting inner surfaces 61 to 64 are surfaces which abut (closely contact with) the abutting outer surfaces 41 to 44 of the turn pipe 30.

The abutting inner surface (first inside surface) 61 is formed on a side surface separated from the groove section 52 among the side surfaces of the accommodation groove 56 (56R, 56L).

The abutting inner surface (first inside surface) 62 is formed on a side surface separated from the groove section 52 among the side surfaces of the accommodation groove 57 (57R, 57L). The abutting inner surface 61 and the abutting inner surface 62 are arranged so as to be mutually orthogonal and come into contact with each other.

The abutting inner surface (second inside surface) 63 is formed on a side surface adjacent to the groove section 52 among the side surfaces of the accommodation groove 56 (56R, 56L). The abutting inner surface 61 is arranged in parallel with the abutting inner surface 63.

The abutting inner surface (third inside surface) 64 is formed on a side surface adjacent to the groove section 52 among the side surfaces of the accommodation groove 57 (57R, 57L). The abutting inner surface 61 is arranged in parallel with the abutting inner surface 64.

Each of the rollers (rolling element) 70 is a columnar member made of a metal material. The plurality of rollers 70 are interposed between the track rail 10 and the slider block 20 (block body 21) and serve to smoothly move the slider block 20 relative to the track rail 10. The slider block 20 is connected to the track rail 10 through the plurality of rollers 70.

The plurality of rollers 70 are disposed within the endless circulation passage L so as to have nearly no gap therebetween, and circulate in the endless circulation passage L. The slider block 20 reciprocates relative to the track rail 10 by rolling and circulation of the plurality of rollers 70.

The rollers 70 are maintained at equal intervals by a belt-shaped retainer 72. The retainer 72 has a plurality of rectangular openings formed at equal intervals in a longitudinal direction thereof. By accommodating the rollers 70 in the rectangular openings, the plurality of rollers 70 are maintained in the retainer 72. The retainer 72 itself has a shape with ends, but the retainer 72 is arranged in an endless form in which both ends thereof are close to each other in the endless circulation passage L. The plurality of rollers 70 circulate in the endless circulation passage L together with the retainer 72.

Next, a connection (joining) structure of the turn pipes 30 to the end plates 50 will be described.

Figure 7:
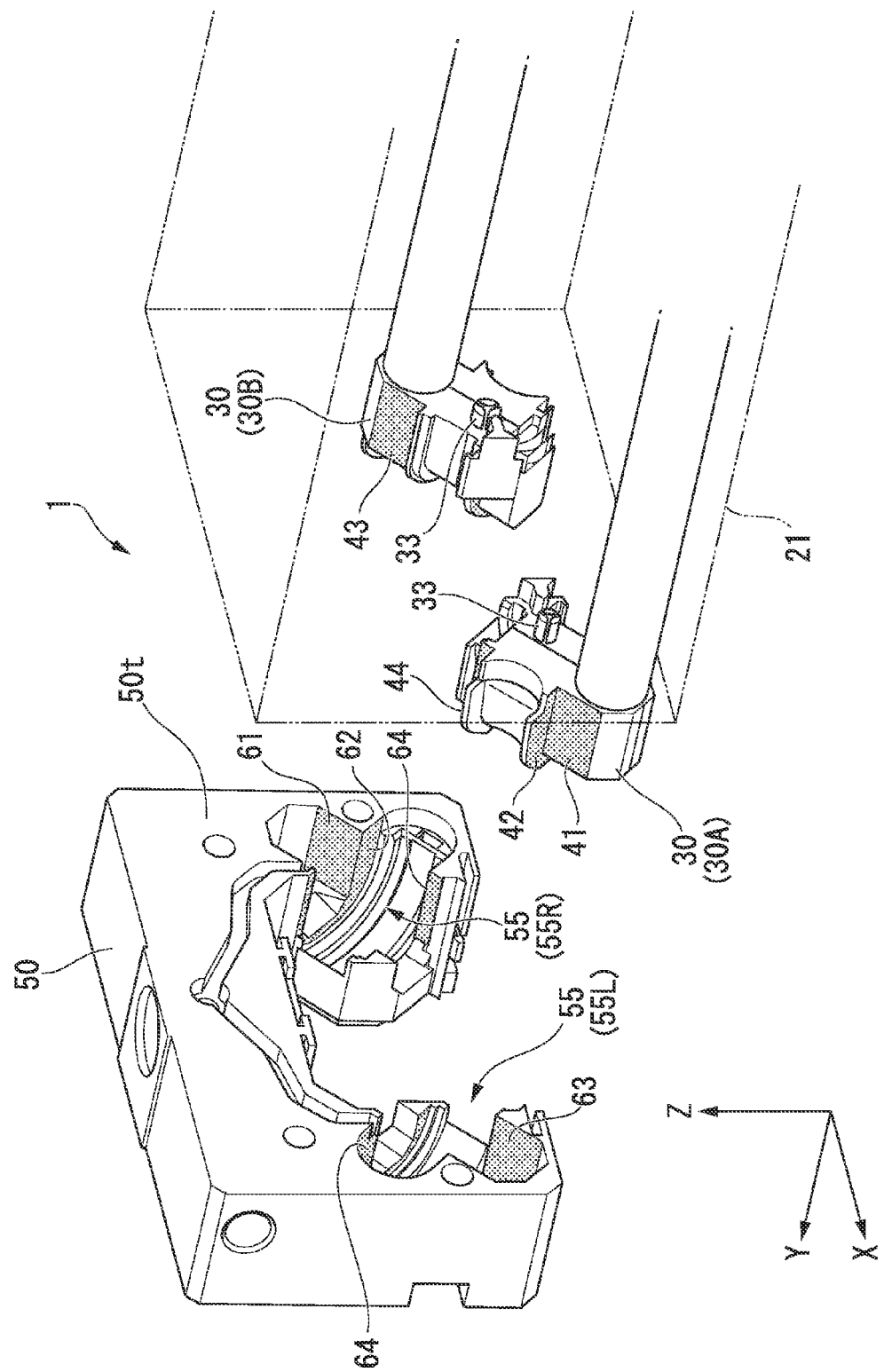
FIG. 7 is a perspective view illustrating a connection structure of the turn pipes 30 to the end plate 50.

FIG. 7 is a perspective view illustrating a connection (joining) structure of the turn pipes 30 to one end plate 50. In FIG. 7, the abutting outer surfaces 41, 42, 43, and 44 and the abutting inner surfaces 61, 62, 63, and 64 are highlighted by dots.

Figure 8:
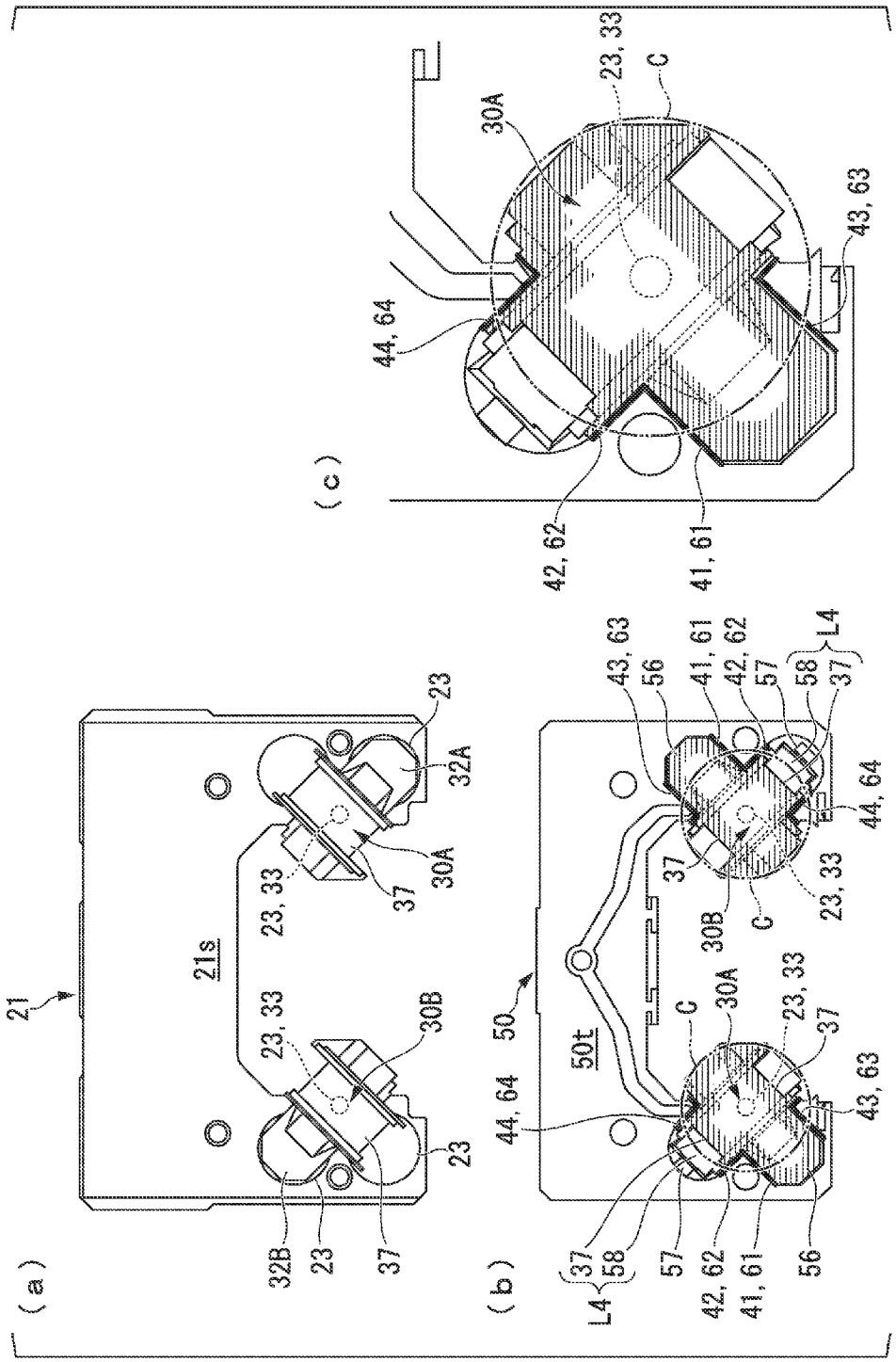
FIG. 8 is a plan view illustrating the connection structure of the turn pipes 30 to the end plate 50.

FIG. 8 is a plan view illustrating the connection (joining) structure of the turn pipes 30 to the end plate 50. FIG. 8(a) is a view illustrating the turn pipes 30 mounted to the block body 21. FIG. 8(b) is a view illustrating the turn pipes 30 mounted to the end plate 50. FIG. 8(c) is an enlarged view illustrating a portion of (b). In FIGS. 8(a), 8(b), and 8(c), the turn pipes 30A and 30B are indicated by hatching. In FIGS. 8(a) and 8(b), the abutting outer surfaces 41, 42, 43, and 44 and the abutting inner surfaces 61, 62, 63, and 64 are highlighted by thick lines.

First, the turn pipes 30 are mounted to the block body 21. The pipe sections 31 of the turn pipes 30 are inserted into the through-holes 22 opened to the end surface 21s of the block body 21 in the Z direction. The two turn pipes 30 (30A, 30B) are inserted into the two through-holes 22, which are each provided at both sides in the X direction, from opposite directions (see FIGS. 3 and 4).

The turn pipe 30A inserted into the block body 21 from the +Y direction and the turn pipe 30B inserted into the block body 21 from the −Y direction are arranged such that the return sections 32A and 32B are mutually orthogonal when viewed from the Y direction.

The tip of the pipe section 31 of the turn pipe 30A is connected to the pipe connection section 34 of the return section 32 of the turn pipe 30B. In addition, the tip of the pipe section 31 of the turn pipe 30B is connected to the pipe connection section 34 of the return section 32 of the turn pipe 30A.

The two endless circulation passages L (LA, LB) are formed by the two turn pipes 30A and 30B. The endless circulation passage LA is formed by the roller rolling hole 35 of the turn pipe 30A, the roller rolling inner peripheral surface 37 of the turn pipe 30B, etc. The endless circulation passage LB is formed by the roller rolling inner peripheral surface 37 of the turn pipe 30A, the roller rolling hole 35 of the turn pipe 30B, etc.

The two endless circulation passages L (LA, LB) are in a cross-turn form orthogonal to each other when viewed from the Y direction.

Each turn pipe 30 is configured such that, in a state in which the pipe section 31 is inserted into the through-hole 22 of the block body 21, the positioning boss 33 provided at the inward surface 32s of the return section 32 is further fitted into the positioning hole 23 formed on the end surface 21s of the block body 21.

Consequently, movement of the turn pipe 30 in the X direction, Y direction, and Z direction, and about the X direction and Z direction with respect to the block body 21 is restricted (fixed)

Even when the positioning structure using the positioning boss 33 and the positioning hole 23 is used, movement (rotation) of the turn pipe 30 about the Y direction is not entirely restricted (fixed). The turn pipe 30 is slightly rotatable about the Y direction centered on the positioning boss 33.

Next, the end plate 50 is fixed to the end surface 21a of the block body 21. In this case, the return section 32 of the turn pipe 30 is accommodated in the return accommodation section 55 formed at the end plate 50. Specifically, the return section 32 of the turn pipe 30A is accommodated in the return accommodation section 55L. The return section 32 of the turn pipe 30B is accommodated in the return accommodation section 55R.

Consequently, the main portion of the return section 32 of the turn pipe 30 is accommodated in the accommodation groove 56 (56R, 56L). A portion (rolling element direction changing passage L3) of the endless circulation passage LA is accommodated in the accommodation groove 56.

The wall portion of the roller rolling inner peripheral surface 37 of the return section 32 is accommodated in the accommodation groove 57 (57R, 57L). The roller rolling inner peripheral surface 37 of the return section 32 and the roller rolling outer peripheral surface 58 of the return accommodation section 55 are paired to form the rolling element direction changing passage L4 of the endless circulation passage LB. A portion (rolling element direction changing passage L4) of the endless circulation passage LB is accommodated in the accommodation groove 57.

As shown in FIG. 8(b), when the return section 32 is accommodated in the return accommodation section 55, the four abutting outer surfaces 41 to 44 of the return section 32 closely contact (abut) one-to-one with the four abutting inner surfaces 61 to 64 of the return accommodation section 55.

The abutting outer surface closely contact with the abutting inner surface 61, the abutting outer surface 42 closely contact with the abutting inner surface 62, the abutting outer surface 43 closely contact with the abutting inner surface 63, and the abutting outer surface 44 closely contact with the abutting inner surface 64.

When the abutting outer surfaces 41 and 42 of the turn pipe 30 closely contact with the abutting inner surfaces 61 and 62 of the end plate 50, the turn pipe 30 is prevented from moving about the Y direction relative to the end plate 50 (rotating around the positioning boss 33).

In FIG. 8(b), by closely contacting the abutting outer surface 41 with the abutting inner surface 61, clockwise rotation of the turn pipe 30A relative to the end plate 50 is restricted. In addition, by closely contacting the abutting outer surface 42 with the abutting inner surface 62, counterclockwise rotation of the turn pipe 30A relative to the end plate 50 is restricted.

Similarly, by closely contacting the abutting outer surface 41 with the abutting inner surface 61, clockwise rotation of the turn pipe 30B relative to the end plate 50 is restricted. In addition, by closely contacting the abutting outer surface 42 with the abutting inner surface 62, counterclockwise rotation of the turn pipe 30B relative to the end plate 50 is restricted.

Furthermore, by closely contacting the abutting outer surfaces 43 and 44 with the abutting inner surfaces 63 and 64 of the end plate 50, the turn pipe 30 is reliably prevented from rotating about the Y direction relative to the end plate 50.

The abutting outer surfaces 41 to 44 and the abutting inner surfaces 61 to 64 are arranged at positions which intersect the same imaginary circle C centered on the positioning boss 33. For this reason, even when rotating force about the Y direction is applied to the turn pipe 30, the rotating force is almost evenly distributed to and received by the abutting outer surfaces 41 to 44 and the abutting inner surfaces 61 to 64. Accordingly, the turn pipe 30 is strongly prevented from rotating about the Y direction relative to the end plate 50.

As such, the two turn pipes 30A and 30B are accommodated in two positions (two return accommodation sections 55) of the end plate 50 in a state in which the turn pipes 30A and 30B is prevented from rotating about the Y direction centered on the positioning boss 33.

Since movement of the two turn pipes 30A and 30B in the X direction and Z direction is previously restricted (fixed), the end plate 50 is prevented from rotating about the Y direction relative to the two turn pipes 30A and 30B. In other words, the end plate 50 is prevented from rotating about the Y direction relative to the block body 21.

Finally, the end plate 50 is fixed to the end surface 21s of the block body 21 by the bolts. The bolts (not shown) are inserted into the four stepped through-holes 51 of the end plate 50 to be fastened to the tapped holes 24 on the end surface 21s of the block body 21. Consequently, the two turn pipes 30A and 30B are fixed to the block body 21 through the end plate 50 in a state in which the turn pipes 30A and 30B is prevented from rotating about the Y direction.

As described above, the linear motion guide 1 may reliably position and fix the plurality of turn pipes 30 mounted to the block body 21. By merely mounting the end plate 50 such that the two turn pipes 30A and 30B are covered by the end plate 50, rotation of the turn pipes 30 about the Y direction relative to the block body 21 can be restricted.

In the conventional linear motion guide, there is a need to use the positioning structure, configured of the positioning boss and the positioning hole, between the block body and the end plate and between the end plate and the turn pipe.

On the other hand, in the linear motion guide 1, the positioning structure between the block body and the end plate can be omitted. Therefore, there is no need to form the plurality of positioning holes on the end surface 21s of the block body 21 by machining. Thus, an increase in manufacturing costs can be suppressed.

Although the shape or combination of each component has been illustratively described in the above embodiment, specific configurations are not limited thereto and a design modification may be made appropriately without departing from the principles and spirit of the invention.

Although the above embodiment has been described as a case in which the four abutting outer surfaces 41 to 44 are formed at the turn pipe 30 and the four abutting inner surfaces 61 to 64 are formed at the end plate 50, the present invention is not limited thereto.

At least two abutting outer surfaces and at least two abutting inner surfaces may also be formed at the turn pipe 30 and the end plate 50. In this case, a combination of the abutting outer surfaces 41 and 42 and the abutting inner surfaces 61 and 62 may also be provided. A combination of the abutting outer surfaces 41 and 43 and the abutting inner surfaces 61 and 63 may also be provided. A combination of the abutting outer surfaces 42 and 44 and the abutting inner surfaces 62 and 64 may also be provided. A combination of the abutting outer surfaces 43 and 44 and the abutting inner surfaces 63 and 64 may also be provided.

Three abutting outer surfaces and three abutting inner surfaces may also be formed at the turn pipe 30 and the end plate 50. Any three combinations of the combinations of the abutting outer surfaces 41 to 44 and the abutting inner surfaces 61 to 64 may be appropriately selected.

The turn pipe 30 is not limited to the cross-turn form.

The turn pipe 30 may not include the pipe section 31. For example, a return guide and the like may also be provided.

The turn pipe (rolling element circulation member) may also be a member that contributes to a change in direction of the rolling element.

The rolling element is not limited to the roller. For example, the rolling element may also be a ball. The rolling element may not include the retainer.

The return accommodation section 55 may also be penetrated in the thickness direction, as long as the end plate 50 can restrict rotation of the turn pipe 30 about the Y direction.

REFERENCE SIGNS LIST

1: linear motion guide (motion device)
10: track rail (track body)
20: slider block
21: block body (moving body)
23: positioning hole
30: turn pipe (rolling element circulation member, rolling element direction changing passage formation member)
33: positioning boss (connection section)
37: roller rolling inner peripheral surface (outer surface)
41, 42: abutting outer surface (first outside surface)
43: abutting outer surface (second outside surface)
44: abutting outer surface (third outside surface)
50: end plate (fixing member, lid body)
55: return accommodation section (accommodation section, concave section)
58: roller rolling outer peripheral surface (inner surface)
61, 62: abutting inner surface (first inside surface)
63: abutting inner surface (second inside surface)
64: abutting inner surface (third inside surface)
70: roller (rolling element)
L3: rolling element direction changing passage (first rolling element direction changing passage)
L4: rolling element direction changing passage (second rolling element direction changing passage)
C: imaginary circle (circumference)

The invention claimed is:

1. A motion device comprising:
a track rail;
a moving body movable along the track rail;
rolling elements rolling in an endless circulation passage formed at the track rail and the moving body;
fixing members each fixed to an end surface of the moving body in a movement direction thereof; and
rolling element circulation members arranged between the moving body and the fixing members to circulate the rolling elements,
wherein each of the rolling element circulation members comprises:
a connection section connected to the end surface of the moving body so as to be rotatable about the movement direction; and
a pair of first outside surfaces arranged in parallel with the movement direction and intersecting each other,
wherein each of the fixing members comprises:
accommodation sections to accommodate the rolling element circulation members; and
a pair of first inside surfaces formed at each of the accommodation sections to closely contact with the pair of first outside surfaces, and
wherein the respective rolling element circulation members and the accommodation sections are provided at both sides of the track rail interposed therebetween.

2. The motion device according to claim 1, wherein:
each of the rolling element circulation members comprises a second outside surface parallel with one side surface of the pair of first outside surfaces; and
each of the fixing members comprises a second inside surface closely contacts with the second outside surface in the associated one of the accommodation sections.

3. The motion device according to claim 2, wherein:
each of the rolling element circulation members comprises a third outside surface parallel with the other side surface of the pair of first outside surfaces; and
each of the fixing members comprises a third inside surface closely contacts with the third outside surface in the associated one of the accommodation sections.

4. The motion device according to claim 3, wherein the first, second, and third outside surfaces and the first, second, and third inside surfaces are arranged on the same circumference around the movement direction centered on the connection section.

5. The motion device according to claim 4, wherein each of the rolling element circulation members is a rolling element direction changing passage formation member formed with a direction changing passage of the endless circulation passage.

6. The motion device according to claim 4, wherein;
the fixing members are lid bodies to accommodate the rolling element circulation members; and
the accommodation sections are concave sections to cover outer surfaces of the rolling element circulation members.

7. The motion device according to claim 3, wherein each of the rolling element circulation members is a rolling element direction changing passage formation member formed with a direction changing passage of the endless circulation passage.

8. The motion device according to claim 3, wherein;
the fixing members are lid bodies to accommodate the rolling element circulation members; and
the accommodation sections are concave sections to cover outer surfaces of the rolling element circulation members.

9. The motion device according to claim 1, wherein each of the rolling element circulation members is a rolling element direction changing passage formation member formed with a direction changing passage of the endless circulation passage.

10. The motion device according to claim 9, wherein;
the fixing members are lid bodies to accommodate the rolling element circulation members; and
the accommodation sections are concave sections to cover outer surfaces of the rolling element circulation members.

11. The motion device according to claim 2, wherein each of the rolling element circulation members is a rolling element direction changing passage formation member formed with a direction changing passage of the endless circulation passage.

12. The motion device according to claim 2, wherein;
the fixing members are lid bodies to accommodate the rolling element circulation members; and
the accommodation sections are concave sections to cover outer surfaces of the rolling element circulation members.

13. The motion device according to claim 1, wherein;
the fixing members are lid bodies to accommodate the rolling element circulation members; and
the accommodation sections are concave sections to cover outer surfaces of the rolling element circulation members.

14. The motion device according to claim 13, wherein:
a first rolling element direction changing passage is formed in each of the rolling element circulation members;
a second rolling element direction changing passage is formed by an outer surface of each of the rolling element circulation members and an inner surface of each of the concave sections; and
the first rolling element direction changing passage and the second rolling element direction changing passage intersect each other when viewed from the movement direction.

* * * * *